INVENTOR
LOUIS A. WILLIAMS

Feb. 7, 1956 L. A. WILLIAMS 2,733,650
MICROWAVE COOKER CONTROLS
Filed March 20, 1953 3 Sheets-Sheet 2

INVENTOR
LOUIS A. WILLIAMS
BY Elmer J. Gorn
ATTORNEY

Feb. 7, 1956 L. A. WILLIAMS 2,733,650
MICROWAVE COOKER CONTROLS
Filed March 20, 1953 3 Sheets-Sheet 3
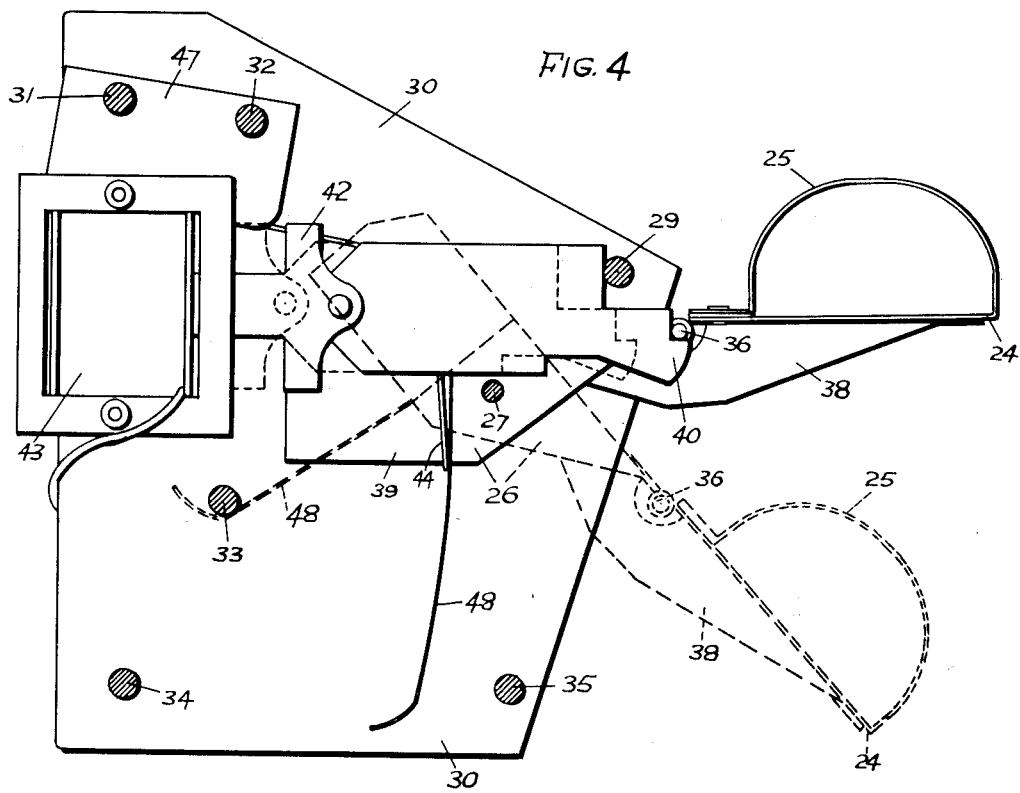
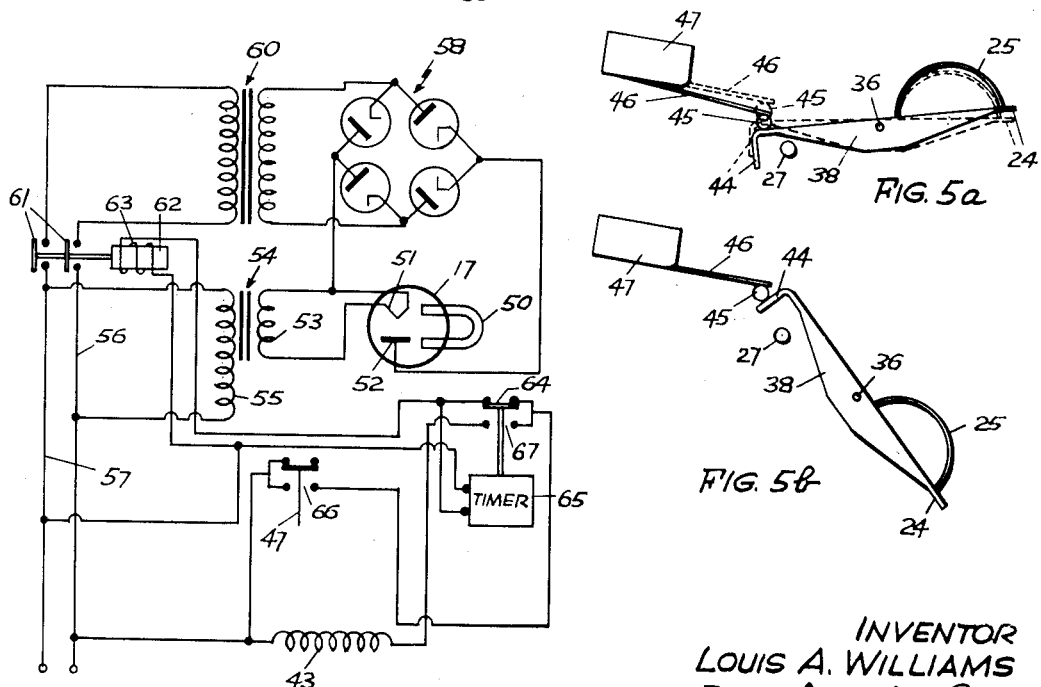
INVENTOR
LOUIS A. WILLIAMS
BY
ATTORNEY United States Patent Office 2,733,650
Patented Feb. 7, 1956

2,733,650

MICROWAVE COOKER CONTROLS

Louis A. Williams, Belmont, Mass., assignor to Raytheon Manufacturing Company, Newton, Mass., a corporation of Delaware Application March 20, 1953, Serial No. 343,661

5 Claims. (Cl. 99—327)

This invention relates to microwave cookers, and more particularly to the mechanism in such a machine that starts the application of heat upon the appearance of a sandwich or other object in the heating compartment, and releases the sandwich into a delivery compartment when heated.

In the automatic vending of heated food, such as hot sandwiches, it is necessary to provide some means for starting the heat source when a sandwich is positioned in the heating compartment, terminating the heating cycle when the food is cooked, and releasing the cooked food into the delivery compartment. The apparatus of this invention provides automatic means for doing these things. By methods known to the automatic vending art, an item of food to be heated is released into the heater compartment through a spring-loaded door. The floor of the heater compartment is formed by a curved spring-loaded member that rotates downward under the weight of the food to actuate a switch that turns on the heat-producing means for the heating cycle. At the end of the heating cycle, a solenoid is energized to release a latch and permit the hinged member to rotate further downward, releasing the food into a delivery compartment. Upon the removal of the food from the delivery compartment, counterweights mounted on the support member bring the rotating member back into position to form the floor of the heating compartment ready to receive the next item of food. While the device is particularly useful in the automatic vending of cooked foods, such as hot sandwiches, it is apparent that it can be used in other automatic operations.

Other and further advantages of this invention will be apparent as the description thereof progresses, reference being had to the accompanying drawings wherein:

Fig. 2 is a side view of a heating means and the release mechanism of the invention;

Fig. 3 is a bottom view of the release mechanism of Fig. 2;

Fig. 4 is a somewhat diagrammatic view of a portion of the release mechanism in two of its operating positions;

Fig. 5a is a view of the switch-operating mechanism showing two of its positions;

Fig. 5b is a view of the switch-operating mechanism in a different position; and Fig. 6 is a schematic digram of the electrical circuits associated with the heating means and release mechanism of the invention.

Figure 1:
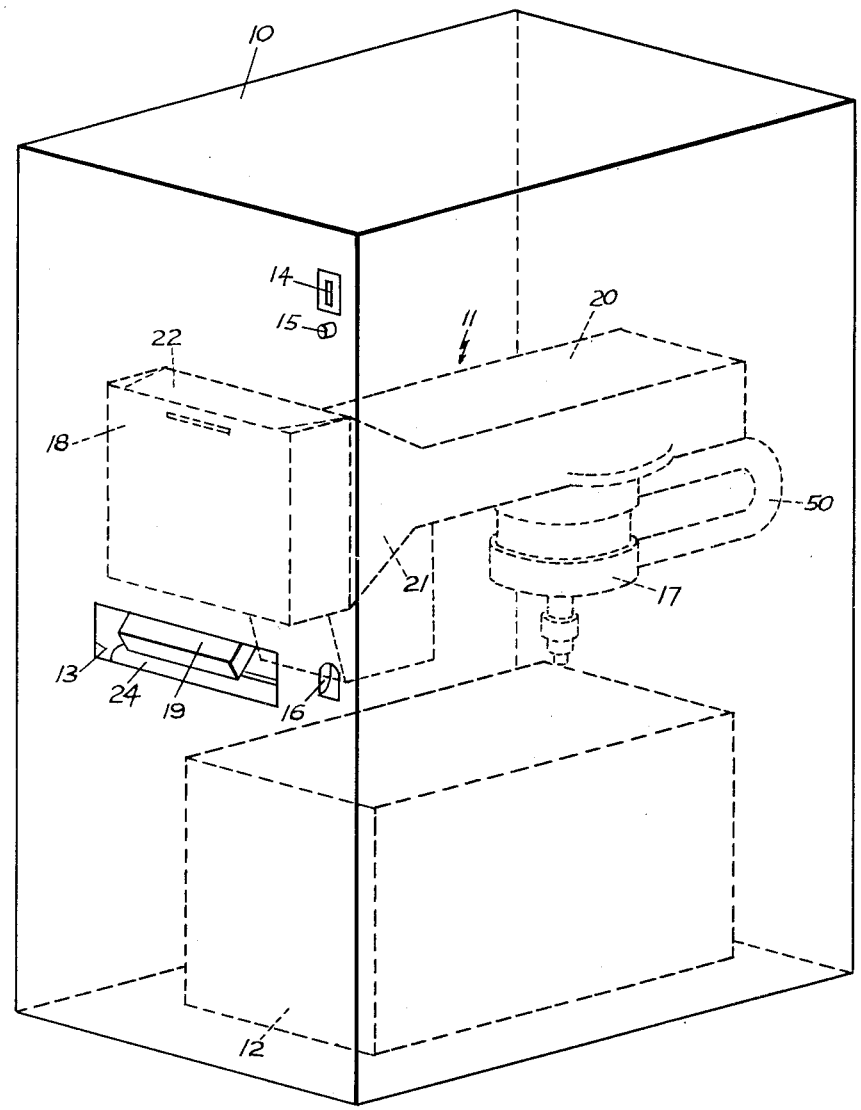
Fig. 1 is an isometric view of a vending machine in which the invention may be used.

In Fig. 1, the numeral 10 designates the case of the vending machine. The foods to be cooked and dispensed are stored in the upper part. The heating means and releasing mechanism of the invention are positioned in the middle section, as shown by the dotted lines, and are designated generally by the numeral 11. The lower part of the vending machine 10 contains the power supply 12, shown in dotted lines. The case 10 has on its front a delivery slot 13, a coin slot 14, a release button 15, and a coin return slot 16; these last three elements operate in conjunction with any of several well-known types of vending mechanisms. The heating means and release mechanism 11 are shown in more detail in Figs. 2 through 4, 5a, and 5b. Energy for heating the food or other material is supplied by a magnetron 17. Energy from the magnetron is coupled to a heating compartment 18 through a section of wave guide 20 that is enlarged to a horn 21 at the end nearest the heating compartment 18. The food is introduced into the compartment 18 through a door 22, as seen in Fig. 1, in the top of the chamber against the action of a spring 23 that tends to cause the door 22 to close, preventing the escape of energy when the food is within the heating compartment 18. The floor of the compartment 18 is formed by a pivoted support 24. This support is formed, preferably, with a curved upper surface 25, as is best seen in Fig. 4. The purpose of this curved surface is to assure that the food 19 after cooking and release will readily slide out of the heating compartment and into the delivery compartment, as seen in Fig. 1. This support member 24 is attached to a bracket 26 that is pivoted to a shaft 27 set in two frame members 28 and 30 that are fastened to the wave guide and held parallel to each other by spacers 29, 31, 32, 33, 34, and 35. The support member 24 is attached pivotally to the bracket 26 by a pin 36 and urged upward to close the compartment 18 by a spring 37. An arm 38 is attached to the bracket 26 and extends backward from the shaft 27 and downward as does the bracket 26. Weights 39 and 39a are attached to the downward extending portion of the bracket 26 to urge the support upward against the bottom of the compartment 18. The bracket 26 is held in this upward position by a latch 40 that is mounted on the frame member 28 in a manner permitting it to move horizontally under the tension of a spring 41 to engage the pin 36. The rear end of the latch 40 is attached to an armature 42 of a solenoid 43. When this solenoid is energized, the latch 40 is pulled out of engagement with the pin 36 against the tension of the spring 41, permitting the support 24 and the bracket 26 to rotate clockwise and downward under the weight of the food or other object 19 in the compartment 18. The rear portion of the arm 38 is formed with a cam surface 44 that contacts roller 45 attached to the front end of an operator 46 of a switch 47 when the support 24 rotates downward in a clockwise direction against the action of the spring 37 under the weight of the food or other material 19 in the compartment 18. This rotation takes place about the pin 36 and before the latch is released, as can best be seen in Fig. 5a. When the solenoid energizes to release the latch 40, permitting the arm 38 and bracket 26 to drop further down, the shape of the cam 44 permits this action to take place without interference from the switch operator 46. A spring 48 is also mounted on the bracket 26 to aid in this restoring action. It will be seen from Fig. 4 that this spring 48 presses against the spacer 33 when the support 24 is in the lower position, as shown in dotted lines in Fig. 4, and in this position is under tension. Upon the removal of the sandwich 19, this tension causes the spring 48 to exert a force in a counterclockwise direction about the shaft 27 which aids in the restoring action of the counterweights 39 and 39a.

The solenoid 43 and the switch 47 operate in an electrical circuit shown in Fig. 6. The magnetron 17 is provided with a permanent magnet 50, a filamentary cathode 51, and an anode 52. The filament 51 of the magnetron 17 is supplied with current from the secondary 53 of a transformer 54, the primary 55 of which is connected to power lines 56 and 57. A source of positive potential comprising a rectifier 58 is connected between the filament 51 and the plate 52 of the magnetron 17.

The rectifier is supplied with A. C. power from the lines 56 and 57 through a transformer 60 over normally-open contacts 61 operated by a relay 62. The coil 63 of the relay 62 is energized from the power lines 56 and 57 over a set of normally-closed contacts 64 on a timer 65 and a set of normally-open contacts 66 on the switch 47. The timer 65 is also energized from the lines 56 and 57 over the normally-open contacts 66 of the switch 47. The timer 65 is also supplied with a pair of normally-open contacts 67 to complete the circuit that supplies potential from the lines 56 and 57 to the solenoid 43.

In operation, when a coin is inserted in the slot 13, a sandwich 19 is released through the door 22 into the heating compartment 18. The weight of the sandwich resting on the support member 24 pivots this member about the pin 36, causing the cam surface 44 on the rear of the arm 38 to rise into contact with the roller 45 on the operator 46 of the switch 47, closing the normally-open contacts 66 of this switch and energizing the relay 62 to close the normally-open contacts 61 to supply anode voltage to the magnetron 17 through the rectifier 58. The closing of these contacts 66 also energizes the coil of the timer 65. When plate voltage is supplied to the magnetron 17, radio frequency energy is supplied to the heating compartment 18, cooking the sandwich 19. After a predetermined time interval sufficient to cook the sandwich, the timer 65 operates to close its normally-open contact 67, completing a circuit to the solenoid 43. The solenoid 43 energizes, releasing the latch 40, and permitting the support member 24 to drop the rest of the way to the position shown in dotted lines in Fig. 4. The curved surface 25 on the support member 24 then causes the sandwich to slide downward and forward into the delivery compartment 13, as seen in Fig. 1. As soon as the sandwich is removed, the counterweights 39 and 39a cause the bracket 26 to move counterclockwise, bringing the support member 24 into position to close the bottom of the heating compartment 18. In this position, the arm 38 is located as shown in Fig. 5a so that the operator 46 drops to open the switch 47, thus opening the contacts 66, as shown in Fig. 6. Therefore, the relay 62 is deenergized. Likewise, the timer 65 is deenergized to return it to its initial position. At this time the system is in its initial position and the machine is ready to resume its next cycle.

What is claimed is:

1. In combination, a heating compartment adapted to contain objects to be heated, means for inserting objects into the heating compartment, a pivoted support forming the floor of the compartment formed with a finger, a radio frequency oscillator for producing radio frequency energy and means for applying said energy to the heating compartment, switch means for starting the oscillator, an operating arm for said switch arranged to be moved by said finger, timing means for controlling the operating time of the oscillator, means under control of said switching means to initiate operation of said timing means, and solenoid means under control of the timing means for releasing the pivoted support permitting said support to swing downward releasing the object.

2. In combination, a heating compartment adapted to contain food to be heated, means for inserting food into the heating compartment, a pivoted support forming the floor of the heating compartment formed with a finger, a radio frequency oscillator for producing radio frequency energy and means for applying said energy to heat food in the compartment, switch means for starting the oscillator, an operating arm for said switch arranged to be moved by said finger, timing means for controlling the operating time of the oscillator, means under control of said switching means to initiate operation of said timing means, and solenoid means under control of the timing means for releasing the pivoted support permitting said support to swing downward releasing the food.

3. In combination, a heating compartment adapted to contain food to be heated, means for inserting food into the heating compartment, a pivoted support forming the floor of the heating compartment formed with a finger, a radio frequency oscillator for producing radio frequency energy and means for applying said energy to heat food in the compartment, switch means for starting the oscillator, an operating arm for said switch arranged to be moved by said finger, timing means for controlling the operating time of the oscillator, means under control of said switching means to initiate operation of said timing means, a solenoid operated latch under control of the timing means for releasing the pivoted support permitting said support to swing downward releasing the food.

4. In combination, a heating compartment adapted to contain food to be heated, means for inserting food into the heating compartment, a pivoted support forming the floor of the heating compartment formed with a finger, a radio frequency oscillator for producing radio frequency energy and means for applying said energy to heat food in the compartment, switch means for starting the oscillator, an operating arm for said switch arranged to be moved by said finger, timing means for controlling the operating time of the oscillator, means under control of said switching means to initiate operation of said timing means, solenoid means under control of the timing means for releasing the pivoted support permitting said support to swing downward releasing the food, and counterweights on said support to return said support to the initial position when the food is removed.

5. In combination, a heating compartment adapted to contain food to be heated, means for inserting food into the heating compartment, a pivoted support forming the floor of the heating compartment formed with a finger, a radio frequency oscillator for producing radio frequency energy and means for applying said energy to heat food in the compartment, switch means for starting the oscillator, an operating arm for said switch arranged to be moved by said finger, timing means for controlling the operating time of the oscillator, means under control of said switching means to initiate operation of said timing means, a solenoid operated latch under control of the timing means for releasing the pivoted support permitting said support to swing downward releasing the food and counterweights on said support to return said support to the initial position when the food is removed.

References Cited in the file of this patent

UNITED STATES PATENTS

| Number | Name | Date |
|---|---|---|
| 1,739,155 | Lincoln | Dec. 10, 1929 |
| 2,288,713 | Ireland | July 7, 1942 |
| 2,363,724 | Ford | Nov. 28, 1944 |
| 2,384,863 | Warner | Sept. 18, 1945 |
| 2,489,500 | Pulliam | Nov. 29, 1949 |
| 2,495,415 | Marshall | Jan. 24, 1950 |
| 2,531,238 | Tandler et al. | Nov. 21, 1950 |
| 2,559,444 | Locke | July 3, 1951 |
| 2,578,971 | Georgeson | Dec. 18, 1951 |
| 2,614,480 | Elmer | Oct. 21, 1952 |
| 2,644,392 | Foster | July 7, 1953 |